UNITED STATES PATENT OFFICE.

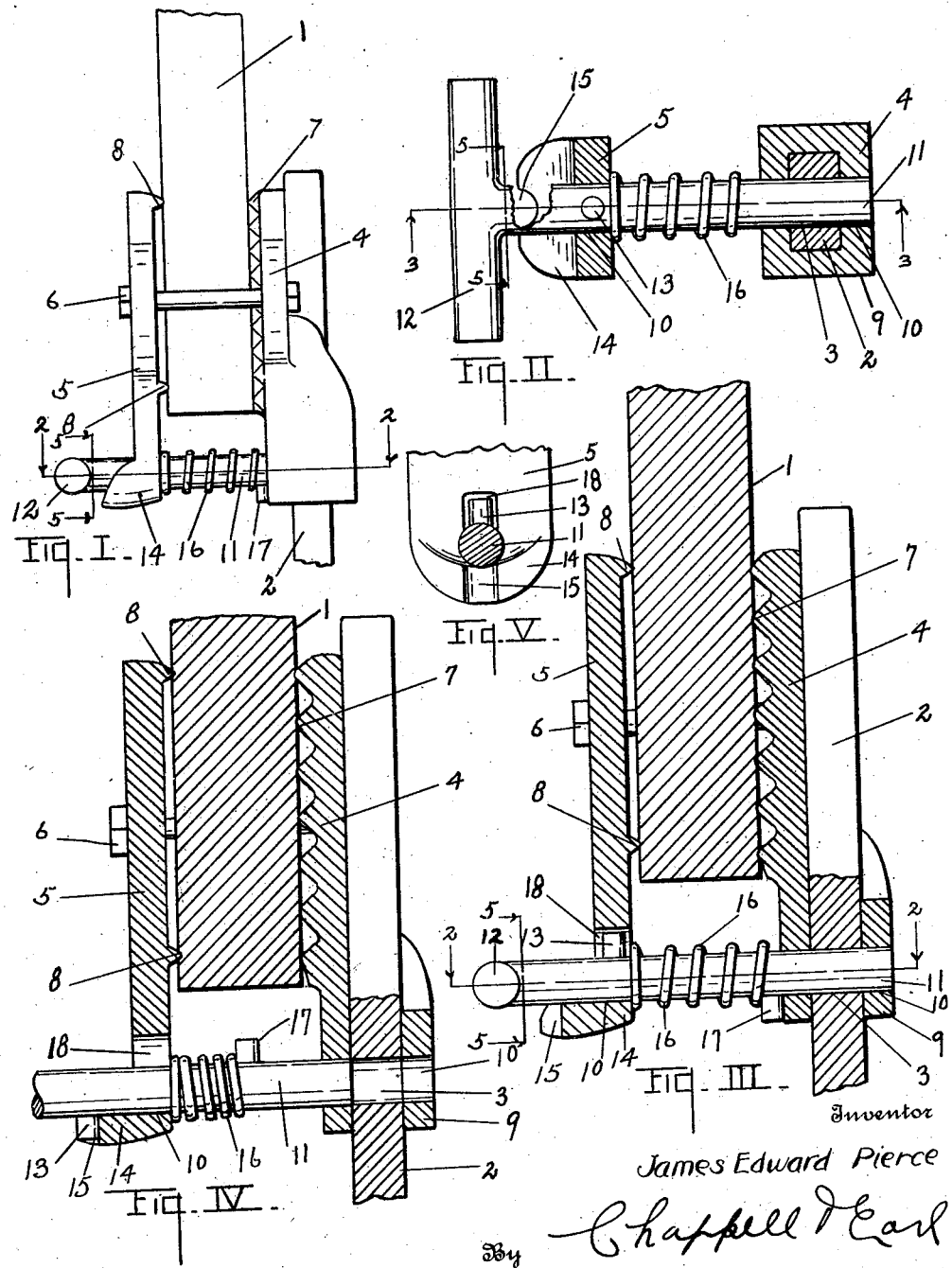

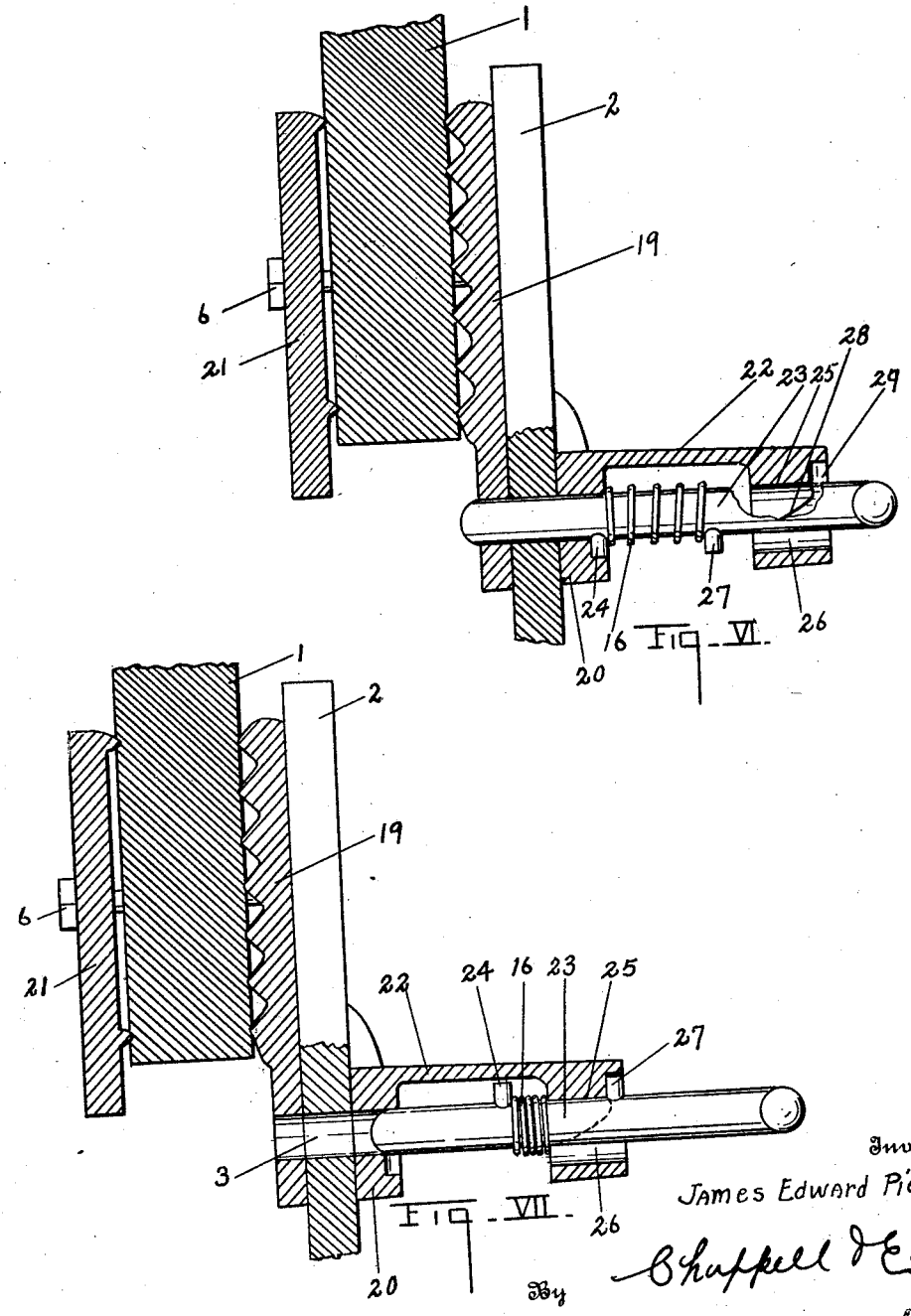

JAMES EDWARD PIERCE, OF ALBION, MICHIGAN, ASSIGNOR TO UNION STEEL PRODUCTS COMPANY, LTD., OF ALBION, MICHIGAN.

ROD COUPLING.

1,408,530. Specification of Letters Patent. Patented Mar. 7, 1922.

Application filed February 7, 1921. Serial No. 443,114.

*To all whom it may concern:*

Be it known that I, JAMES EDWARD PIERCE, a citizen of the United States, residing at Albion, county of Calhoun, and State of Michigan, have invented certain new and useful Improvements in Rod Couplings, of which the following is a specification.

This invention relates to improvements in rod couplings.

The main object of this invention is to provide an improved coupling for the connecting rod of a windmill and the pump rod which may be quickly applied or installed and is very convenient to use, and also one which is strong and durable.

Further objects and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side view of my improved coupling, the connecting rod and the pump rod being broken away.

Fig. II is a horizontal section on a line corresponding to line 2—2 of Figs. I and III.

Fig. III is a detail vertical section on a line corresponding to line 3—3 of Fig. II showing the coupling pin in its engaged position.

Fig. IV is a similar detail vertical section with the coupling pin in its retracted position.

Fig. V is a detail section on a line corresponding to line 5—5 of Fig. I, II and III.

Fig. VI is a detail vertical section of a modified form of my invention with the coupling pin in engaging position.

Fig. VII is a similar detail section with the coupling pin in disengaged position.

In the drawing similar reference characters refer to similar parts throughout the several views, and the sectional views are taken looking in the direction of the little arrows at the ends of the section lines.

Referring to the drawing, 1 represents the connecting rod of a windmill and 2 a pump rod provided with one or more holes 3, as is the usual practice.

My improved coupling comprises a pair of coupling members 4 and 5 which are clamped upon the lower end of the connecting rod 1 by means of the bolt 6, the coupling member 4 has a series of corrugation-like teeth 7, while the coupling member 5 has teeth 8 which increase the clamping grip of the members upon the connecting rod 1 which is ordinarily of wood.

The rear coupling member 4 is provided with a sleeve 9 for the pump rod and the members are provided with alined holes 10 for the coupling pin 11, so that when the hole 3 in the pump rod is brought into alinement with the holes 10, the pin passes through the pump rod as shown in Fig. III.

The coupling pin is provided with a hand piece 12 by means of which it may be rotated carrying the lug 13 over the cam 14 on the front coupling member and thereby retracting the pin and holding it in its retracted position, or the coupling pin may be pulled back and then rotated to engage the lug with the notch 15 in the cam thereby holding the pin in its rotated position. The pin is yieldingly held in engaging position by means of the spring 16 which is supported at one end by the front coupling member 5 and engages the lug 17 in the pin.

The front coupling member is provided with a recess 18 adapted to receive the lug 13 when the pin is in engaging position. When it is desired to engage the pin it is only necessary to release the lug from the notch 15 and movement of either the connecting rod or the pump rod will bring holes 3 and 10 into register. To disengage and lock the pin in disengaged position it is only necessary to disengage the lug from the recess and turn the pin and engage it with the notch 15.

In an embodiment shown in Figs. VI and VII the coupling member 19 which corresponds to the coupling member 4 of the embodiment described is provided with the sleeve 20 for the pump rod 2. The coupling member 21 which corresponds to the coupling member 5 of the embodiment illustrated in Figs. I to V is merely a clamping member. The coupling sleeve 20 is provided with an extension or housing 22 adapted to receive and support the coupling pin 23. The extension 22 serves as a housing for the spring 16. The inner end of the spring engages the lug 24 on the pin. The extension is provided with a bore 25 to receive the coupling pin, the bore having a slot 26 at its under side adapted to receive the lug 27 on the pin.

The extension or housing 22 has a cam surface 28 corresponding to the cam surface 14 of the embodiment shown in Figs. I to V, there being a notch-like recess 29 at the top of the cam to receive the lug 27 as illustrated in Fig. VII thereby retaining the coupling bolt in disengaged position.

The structure shown in Figs. I to V has the advantage of being more compact. On the other hand the structure shown in Figs. VI and VII has the advantage of being more conveniently assembled on the pump rod and connecting rod as the coupling pin is supported entirely by the coupling member 19.

Having thus described my invention, what I claim as new and desire to secure by Letters Patent, is,

1. In a coupling, the combination of front and rear coupling members adapted to be clamped upon the end of a connecting rod and provided with alined coupling pin holes, a coupling pin provided with a hand piece and having a pair of lugs thereon, a spring arranged on said coupling pin between the front coupling member and the inner of said lugs normally urging the pin to engaging position, the rear coupling member being provided with a sleeve adapted to receive a pump rod, and the front coupling member with a cam disposed to coact with the outer lug on said pin whereby when the pin is rotated it is retracted, said cam having a notch at its outer end adapted to receive the outer lug and hold the pin in its disengaging position against the tension of said spring, there being a recess in said front coupling member adapted to receive said lug when the pin is in its engaging position.

2. In a coupling, the combination of front and rear coupling members adapted to be clamped upon the end of a connecting rod and provided with alined coupling pin holes, a coupling pin provided with a hand piece and having a pair of lugs thereon, a spring arranged on said coupling pin between the front coupling member and the inner of said lugs normally urging the pin to engaging position, the rear coupling member being provided with a sleeve adapted to receive a pump rod, and the front coupling member with a cam disposed to coact with the outer lug on said pin whereby when the pin is rotated it is retracted.

3. In a coupling, the combination of front and rear coupling members adapted to be clamped upon the end of a connecting rod and provided with alined coupling pin holes, a coupling pin having a lug thereon, a spring for urging the pin to engaging position, the rear coupling member being provided with a sleeve adapted to receive a pump rod, and the front coupling member with a cam disposed to coact with the lug on said pin whereby when the pin is rotated it is retracted, said cam having a notch at its outer end adapted to receive the lug and hold the pin in its disengaging position against the tension of said spring, there being a recess in said coupling member adapted to receive said lug when the pin is in its engaging position.

4. In a coupling, the combination of front and rear coupling members adapted to be clamped upon the end of a connecting rod and provided with alined coupling pin holes, a coupling pin having a lug thereon, a spring for urging the pin to engaging position, the rear coupling member being provided with a sleeve adapted to receive a pump rod, and the front coupling member with a cam disposed to coact with the lug on said pin whereby when the pin is rotated it is retracted.

5. In a coupling, the combination of a pair of coupling members adapted to be clamped upon the end of a connecting rod, a coupling pin having a lug thereon, a spring for urging said pin to engaging position, a second lug on said coupling pin, one of said coupling members being provided with a cam disposed to coact with said second lug whereby when said pin is rotated it is retracted.

In witness whereof, I have hereunto set my hand and seal in the presence of two witnesses.

JAMES EDWARD PIERCE. [L. S.]

Witnesses:
 GEO. E. DEAN,
 GORDON B. WHEELER.